Dec. 13, 1966   A. C. WICKMAN   3,290,878
POWER TRANSMISSION SYSTEM FOR A GAS TURBINE ENGINE
Filed Dec. 7, 1964
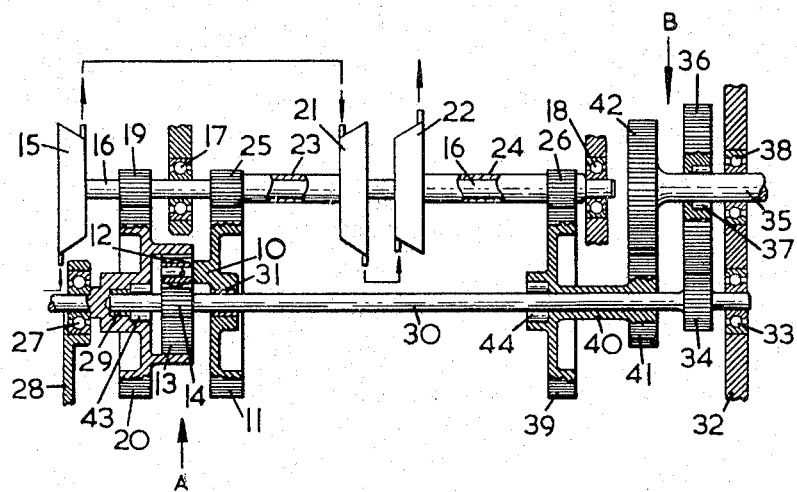

United States Patent Office 3,290,878
Patented Dec. 13, 1966

3,290,878
POWER TRANSMISSION SYSTEM FOR A GAS
TURBINE ENGINE
Axel C. Wickman, 69 S. Washington Drive,
St. Armand's Key, Sarasota, Fla.
Filed Dec. 7, 1964, Ser. No. 416,298
Claims priority, application Great Britain, Dec. 12, 1963,
49,213/63
15 Claims. (Cl. 60—39.16)

The invention relates to a power transmission system for a gas turbine engine of the kind including a first turbine rotor capable of driving a compressor at its full capacity, and a second turbine rotor provided with a power output shaft.

It has previously been proposed in my U.S. patent specification No. 2,981,063 to provide a power transmission system, for a gas turbine engine of the kind set forth, in which the first turbine rotor is connected to drive the compressor through a first, overdrive, epicyclic gearing of which the reaction member is drivingly connected to a drive shaft, a unidirectional clutch is arranged to prevent the first turbine rotor from rotating faster than the compressor, and the power output shaft of the second turbine rotor and the drive shaft are connected to drive a common power output shaft through a second underdrive epicyclic gearing which is arranged so that the power output shaft of the second turbine rotor will rotate at a ratio of, but slower than, the speed of the drive shaft. With this arrangement the differential speed between the drive shaft and the power output shaft of the second turbine rotor gives beneficial results whilst the common power output shaft is being accelerated from rest and the compressor is being accelerated up to its full capacity speed. However, with this arrangement the first, overdrive, epicyclic gearing will have its planet carrier driven at the same speed as the first turbine rotor and this presents a problem if the turbine is of a high speed variety capable of operating at, say, 45,000 r.p.m. as the speed of the planet carrier will be considerably in excess of the maximum speeds at which planet carriers have been designed to run.

It is an object of this invention to provide a power transmission system, for a gas turbine engine of the kind including a first turbine rotor capable of driving a compressor at its full capacity and a second turbine rotor provided with a power output shaft, which will enable an overdrive epicyclic gearing to be arranged operatively between the first turbine rotor and the compressor with its reaction member drivingly connected to a drive shaft without the planet carrier being driven at excessively high speeds.

According to the invention a power transmission system, for a gas turbine of the kind including a first turbine rotor capable of driving a compressor at its full capacity and a second turbine rotor provided with a power output shaft, has the first turbine rotor connected to drive a power input member of an overdrive epicyclic gearing through a reduction gearing, the compressor connected to be driven from a power output member of the epicyclic gearing through a multiplication gearing, the reaction member of the epicyclic gearing drivingly connected to a drive shaft, a further gearing connecting the drive shaft and the power output shaft of the second turbine rotor to a common power output shaft, and the said further gearing arranged so that the power output shaft of the second turbine rotor will rotate at a ratio of the speed of the drive shaft but slower than the first turbine rotor. Preferably the ratio of the reduction gearing is equal to the ratio of the multiplication gearing. However, if desired, these ratios may be different in order to give a desired relationship between the speed of the compressor and the speed of the first turbine rotor. Preferably a unidirectional clutch is arranged to prevent the first turbine rotor from rotating faster than the compressor.

According to a further feature a second unidirectional clutch may be arranged operatively between the reaction member of the epicyclic gearing and the said further gearing, whereby the speed of the second turbine rotor can increase above the ratio dictated by the said further gearing by causing the second unidirectional clutch to freewheel.

According to another feature a third unidirectional clutch may be arranged operatively between the second turbine rotor and the first turbine rotor to prevent the speed of the second turbine rotor from exceeding that of the first turbine rotor.

According to yet another feature the power output shaft of the second turbine rotor may be connected to drive said further gearing through a second reduction gearing of which the ratio is equal to the ratio of the reduction gearing between the first turbine rotor and the power input member of the epicyclic gearing. In such a case both the said reduction gearings and the said multiplication gearing may, according to a further feature, have one gear wheel coaxial with the drive shaft and all have the same ratio, the first unidirectional clutch is arranged operatively between the reaction member of the epicyclic gearing and the gear wheel of the multiplication gearing that is coaxial with the drive shaft, and the third unidirectional clutch is arranged operatively between the drive shaft and the gear wheel of the second reduction gearing that is coaxial with the drive shaft.

According to a further feature the said further gearing may include two reduction gearings of different ratios, the reduction gearing with the higher ratio operatively connecting the drive shaft to the common power output shaft, and the reduction gearing with the lower ratio operatively connecting the gear wheel of the said second reduction gearing that is coaxial with the drive shaft to the common power output shaft.

One embodiment of the invention is now described, by way of example only, in the accompanying drawing which is a diagrammatic axial section through a gas turbine engine, of the kind including a first turbine rotor capable of driving a compressor at its full capacity and a second turbine rotor provided with a power output shaft, and having a power transmission system in accordance with the invention for driving the road wheels of a motor vehicle.

In the drawing the epicyclic gearing is indicated generally at A and the said further gearing at B. The power input member of gearing A is a planet carrier 10 which is driven by a gear wheel 11 and carries a series of planet gear wheels 12 meshing with an annulus gear wheel 13 and with a sun gear wheel 14 which constitutes the reaction member of gearing A. The compressor 15 is mounted on a shaft 16 supported by bearings 17, 18 and is drivingly connected to a gear wheel 19 which is driven by a gear wheel 20 formed integral with the annulus gear wheel 13.

The first turbine rotor 21 and the second turbine rotor 22 are rotatively supported by respective tubular shafts 23, 24 from the shaft 16 intermediate bearings 17 and 18, and drive respective gear wheels 25, 26. In this manner the first turbine rotor 21 is connected to drive the planet carrier 10 through a reduction gearing 25, 11 of which the ratio is such as to allow the maximum speed of the first turbine rotor to exceed the maximum safe speed of the planet carrier without causing the latter to exceed its maximum safe speed. The multiplication gearing 20, 19 between the gearing A and the compressor 15 is of the same ratio as that of the reduction gearing 25, 11 whereby to counteract the effect of the latter on the speed of the compressor.

The gear wheel 20 and the annulus gear wheel 13 are supported by a bearing 27 from a casing 28 and by a bush 29 from a drive shaft 30 which is drivingly connected to the sun gear wheel 14 and extends through a bush 31 of gear wheel 11. The end of the drive shaft 30 remote from the sun gear wheel 14 is supported from a casing 32 by a bearing 33 and is drivingly connected to a gear wheel 34 which is arranged to drive a common power output shaft 35 through a gear wheel 36 and a unidirectional clutch 37 which allows the common power output shaft 35 to rotate faster than gear wheel 36. The common power output shaft 35 is aligned with the shaft 16 and is supported from the casing 32 by a bearing 38.

The common power output shaft 35 is also connected to be driven by the second turbine rotor 22 through the tubular shaft 24, gear wheel 26, a gear wheel 39 rotatively supported from the drive shaft 30 by a hub 40, a gear wheel 41 drivingly connected to a gear wheel 39, and a gear wheel 42 coaxially fast with the common power output shaft 35.

When the vehicle in which the power transmission system is installed is at rest with the gas turbine engine not started, the common power output shaft 35, which is connected to drive the road wheels of the vehicle, will be held stationary by the resistance of the vehicle against the initiation of motion and, consequently, drive shaft 30 and sun gear wheel 14 will be held stationary by the engagement of gears 34 and 36.

When the gas turbine engine is started, the first turbine rotor 21 will drive the compressor 15 at an overdrive ratio through reduction gearing 25 and 11 and multiplication gearing 20 and 19 without causing the planet carrier 10 to be driven above its safe maximum speed, and the torque reaction on sun gear wheel 14 will be applied to the road wheels through drive shaft 30, gear wheels 34 and 36 and unidirectional clutch 37. At the same time, the torque generated on the second turbine rotor 22 will also be applied to the road wheels through reduction gearing 26 and 39, and gear wheels 41 and 42.

The torque reaction on the common power output shaft 35 will rise as the speed of turbine rotor 21 increases and will cause the vehicle to accelerate from rest. As the speed of the vehicle increases, the speed of the drive shaft 30 and the speed of the hub 40 will increase differentially due to the difference in the ratios of the reduction gear trains 34 and 36, and 41 and 42. For instance, if the ratio of gears 34 and 36 is 1:3 and the ratio of gears 41 and 42 is 1:1½ as shown in the drawing, hub 40 will rotate at half the speed of drive shaft 30. It will be appreciated that, as the drive shaft 30 accelerates, the sun gear wheel 14 will accelerate and the overdrive ratio of the compressor 15 will diminish until the latter rotates at the same speed as the first turbine rotor 21. When this occurs a unidirectional clutch 43 will lock the sun gear wheel 14 to the annulus gear wheel 13 and will thus prevent the speed of the first turbine rotor 21 from exceeding the speed of the compressor 15.

When the unidirectional clutch 43 is locked, the drive shaft 30 is driven at the same speed as gear wheel 11 which is determined by the speed of the first turbine rotor 21 and the ratio of gear wheels 11 and 25, for instance 5:1 as shown in the drawing. As the ratio of gear wheels 39 and 26 is also 5:1, and as the hub 40 rotates at half the speed of drive shaft 30 as previously explained, it will be seen that whilst the speed of the first turbine rotor 21 has been increasing, the speed of the second turbine rotor 22 has increased so that it is half the speed of the first turbine rotor 21.

The power output of the first turbine rotor 21 is therefore divided between the compressor 15 and the common power output shaft 35 whilst the power output of the second turbine rotor 22 is transmitted solely to the common power output shaft 35. However, as the speed of the compressor 15 increases it will require a larger proportion of the power output from the first turbine rotor 21 and the second turbine rotor 22 will provide a larger proportion of the power transmitted to the common power output shaft 35. Eventually, the second turbine rotor 22 will produce sufficient power to cause the unidirectional clutch 37 to freewheel so that the total power transmitted by the common power output shaft 35 is derived from the second turbine rotor 22, and that the compressor 15 is provided with the whole power output of the first turbine rotor 21, the reaction on the sun gear wheel 14 being transmitted to the gear wheel 20 by unidirectional clutch 43.

As the unidirectional clutch 37 starts to freewheel the speed of the second turbine rotor 22 will increase to a value above half the speed of the first turbine rotor 21. A further unidirectional clutch 44 is arranged between the drive shaft 30 and the hub 40 to prevent the latter from rotating faster than the drive shaft 30 and thus to prevent the speed of the second turbine rotor 22 from exceeding the speed of the first turbine rotor 21.

When the vehicle tends to overrun the engine the unidirectional clutch 37 will freewheel, but the unidirectional clutches 43 and 44 will lock so that the compressor 15 will be driven through gear wheels 19, 20, 41 and 42 from the common power output shaft 35. In this manner the power required to motor the compressor 15 will provide engine braking, and the positive drive from the common power output shaft 35 to both the turbine rotors 21 and 22 and to the compressor 15 will prevent the gas turbine from stalling whilst the vehicle is overrunning and the first turbine rotor 21 produces only idling power.

If desired the gearing B may be modified in any known manner to provide a reverse drive. For instance, it may be modified in accordance with the teaching of FIGURE 3 of my copending patent application No. 382,502.

What I claim as my invention and desire to secure by Letters Patent of the United States is:

1. A power transmission system for a gas turbine engine including; a compressor, a first turbine rotor capable of driving said compressor at its full capacity, a power output shaft, a second turbine rotor connected to drive said power output shaft, said power transmission including an overdrive epicyclic gearing, a power input member to said overdrive epicyclic gearing, a power output member from said overdrive epicyclic gearing, a reduction gearing connecting said first turbine rotor to drive said power input member, a multiplication gearing connecting said power output member to drive said compressor, a drive shaft, a reaction member for said overdrive epicyclic gearing, said reaction member being drivingly connected to said drive shaft, a common power output shaft, a further gearing connecting said drive shaft and the power output shaft of said second turbine rotor to drive said common power output shaft, and said further gearing being arranged for the power output shaft of said second turbine rotor to rotate slower than said first turbine rotor.

2. A power transmission system as in claim 1, in which the ratio of said reduction gearing is equal to the ratio of said multiplication gearing.

3. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a reduction gearing connecting said first turbine rotor to drive said power input member, a multiplication gearing connecting said power output member to drive said compressor, a unidirectional clutch arranged operatively between said compressor and said first turbine rotor to prevent the latter from rotating faster than the compressor, a drive shaft, a reaction member for said overdrive epicyclic gearing, said reaction member being drivingly connected to said drive shaft, a common power output shaft, a further gearing connecting said drive shaft and the lower output shaft of said second turbine rotor to drive said common power output shaft, and said further gearing being arranged for the power output shaft of said second turbine rotor to rotate slower than said first turbine rotor.

4. A power transmission system for a gas turbine engine including; a compressor, a first turbine rotor capable of driving said compressor at its full capacity, a power output shaft, a second turbine rotor connected to drive said power output shaft, said power transmission including an overdrive epicyclic gearing, a power input member to said overdrive epicyclic gearing, a power output member from said overdrive epicyclic gearing, a reduction gearing connecting said first turbine rotor to drive said power input member, a multiplication gearing connecting said power output member to drive said compressor, a drive shaft, a reaction member for said overdrive epicyclic gearing, said reaction member being drivingly connected to said drive shaft, a common power output shaft, a further gearing connecting said drive shaft and the power output shaft of said second turbine rotor to drive said common power output shaft, and said further gearing being arranged for the power output shaft of said second turbine rotor to rotate slower than said first turbine rotor, and a unidirectional clutch arranged operatively between said reaction member and said further gearing whereby the second turbine rotor will rotate faster than the ratio dictated by said further gearing when said unidirectional clutch free wheels.

5. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing a reduction gearing connecting said first turbine rotor to drive said power input member, a multiplication gearing connecting said power output member to drive said compressor, a drive shaft, a reaction member for said overdrive epicyclic gearing, said reaction member being drivingly connected to said drive shaft, a common power output shaft, a further gearing connecting said drive shaft and the power output shaft of said second turbine rotor to drive said common power output shaft, said further gearing being arranged for the power output shaft of said second turbine rotor to rotate slower than said first turbine rotor, a first unidirectional clutch arranged operatively between said reaction member and said further gearing whereby the second turbine rotor will rotate faster than the ratio dictated by said further gearing when said unidirectional clutch free wheels, and a second unidirectional clutch arranged operatively between said second turbine rotor and said first turbine rotor to prevent the second turbine rotor from rotating faster than said first turbine rotor.

6. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a first reduction gearing connecting said first turbine rotor to drive said power input member, a multiplication gearing connecting said power output member to drive said compressor, a drive shaft, a reaction member for said overdrive epicyclic gearing, said reaction member being drivingly connected to said drive shaft, a common power output shaft, a further gearing connecting said drive shaft to drive said common power output shaft, a second reduction gearing of which the ratio is equal to the ratio of said first reduction gearing, said second reduction gearing operatively connecting said power output shaft of said second turbine rotor to drive said further gearing, and said further gearing being arranged for the power output shaft of said second turbine rotor to rotate slower than said first turbine rotor.

7. A power transmission system as in claim 6, in which both the said reduction gearings and said multiplication gearing have the same ratio, one gear of said first reduction gearing being coaxial with said drive shaft, one gear wheel of said second reduction gearing being coaxial with said drive shaft, and one gear wheel of said multiplication gearing being also coaxial with said drive shaft.

8. A power transmission system as in claim 7, in which said further gearing comprises two reduction gearings of different ratios, the reduction gearing with the higher ratio operatively connecting said drive shaft to drive said common power output shaft, and the reduction gearing with the lower ratio operatively connecting the said one gear wheel of the said second reduction gearing to drive said common power output shaft.

9. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a first reduction gearing connecting said first turbine rotor to drive said power input member, a multiplication gearing connecting said power output member to drive said compressor, a drive shaft, a reaction member for said overdrive epicyclic gearing, said reaction member being drivingly connected to said drive shaft, a common power output shaft, a further gearing connecting said drive shaft to drive said common power output shaft, a second reduction gearing of which the ratio is equal to the ratio of said first reduction gearing, said second reduction gearing operatively connecting said power output shaft of said second turbine rotor to drive said further gearing, said further gearing comprising two reduction gearings of different ratios, the reduction gearing with the higher ratio operatively connecting said drive shaft to drive said common power output shaft, and the reduction gearing with the lower ratio operatively connecting the said second reduction gearing to drive the said common power output shaft.

10. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a reduction gearing connecting said first turbine rotor to drive said power input member, a multiplication gearing connecting said power output member to drive said compressor, a first unidirectional clutch arranged operatively between said compressor and said first turbine rotor to prevent the latter from rotating faster than the compressor, a drive shaft, a reaction member for said overdrive epicyclic gearing, said reaction member being drivingly connected to said drive shaft, a common power output shaft, a further gearing connectinug said drive shaft and the power output shaft of said second turbine rotor to drive said common power output shaft, said further gearing being arranged for the power output shaft of said second turbine rotor to rotate slower than said first turbine rotor, and a second unidirectional clutch arranged operatively between said reaction member and said further gearing whereby the second turbine rotor will rotate faster than the ratio dictated by said further gearing when said unidirectional clutch free wheels.

11. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a reduction gearing connecting said first turbine rotor to drive said power input member, a multiplication gearing connecting said power output member to drive said compressor, a first unidirectional clutch arranged operatively between said compressor and said first turbine rotor to prevent the latter from rotating faster than the compressor, a drive shaft, a reaction member for said overdrive epicyclic gearing, said reaction member being drivingly connected to said drive shaft, a common power output shaft, a further gearing connecting said drive shaft and the power output shaft of said second turbine rotor to drive said common power output shaft, said further gearing being arranged for the power output shaft of said second turbine rotor to rotate slower than said first turbine rotor, a second unidirectional clutch arranged operatively between said reaction member and said further gearing whereby the second turbine rotor will rotate faster than the ratio dictated by said further gearing when said unidirectional clutch free wheels, and a third unidirectional clutch arranged operatively between said second turbine rotor and said first turbine rotor to prevent the second turbine rotor from rotating faster than said first turbine rotor.

12. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a first reduction gearing connecting said first turbine rotor to drive said power input member, a multiplication gearing connecting said power output member to drive said compressor, a first unidirectional clutch arranged operatively between said compressor and said first turbine rotor to prevent the latter from rotating faster than the compressor, a drive shaft, a reaction member for said overdrive epicyclic gearing, said reaction member being drivingly connected to said drive shaft, a common power output shaft, a further gearing connecting said drive shaft to drive said common power output shaft, a second reduction gearing of which the ratio is equal to the ratio of said first reduction gearing, said second reduction gearing operatively connecting said power output shaft of said second turbine rotor to drive said further gearing, said further gearing being arranged for the power output shaft of said second turbine rotor to rotate slower than said first turbine rotor, a second unidirectional clutch arranged operatively between said reaction member and said further gearing whereby the second turbine rotor will rotate faster than the ratio dictated by said further gearing when said unidirectional clutch free wheels, and a third unidirectional clutch arranged operatively between said second turbine rotor and said first turbine rotor to prevent the second turbine rotor from rotating faster than said first turbine rotor.

13. A power transmission system as in claim 11, in which both the said reduction gearings and said multiplication gearing have the same ratio, one gear of said first reduction gearing being coaxial with said drive shaft, one gear wheel of said second reduction gearing being coaxial with said drive shaft, one gear wheel of said multiplication gearing being also coaxial with said drive shaft, said first unidirectional clutch being arranged operatively between said reaction member and said one gear wheel of said multiplication gearing, and said third unidirectional clutch being arranged operatively between said drive shaft and said one gear wheel of said second reduction gearing.

14. A power transmission system as in claim 13, in which said further gearing comprises two reduction gearings of different ratios, the reduction gearing with the higher ratio operatively connecting said drive shaft to drive said common power output shaft, and the reduction gearing with the lower ratio operatively connecting the said one gear wheel of the said second reduction gearing to drive said common power output shaft.

15. A power transmission system for a gas turbine engine including; a compressor, a first turbine rotor capable of driving said compressor at its full capacity, a power output shaft, a second turbine rotor connected to drive said power output shaft, an overdrive epicyclic gearing, a power input member to said overdrive epicyclic gearing, a power output member from said overdrive epicyclic gearing, a first reduction gearing connecting said first turbine rotor to drive said power input member, a multiplication gearing connecting said power output member to drive said compressor, a first unidirectional clutch arranged operatively between said compressor and said first turbine rotor to prevent the latter from rotating faster than the compressor, a drive shaft, a reaction member for said overdrive epicyclic gearing, said reaction member being drivingly connected to said drive shaft, a common power output shaft, a further gearing connecting said drive shaft to drive said common power output shaft, a second reduction gearing of which the ratio is equal to the ratio of said first reduction gearing, said second reduction gearing operatively connecting said power output shaft of said second turbine rotor to drive said further gearing, said further gearing comprising two reduction gearings of different ratios, the reduction gearing with the higher ratio operatively connecting said drive shaft to drive said common power output shaft, and the reduction gearing with the lower ratio operatively connecting the said second reduction gearing to drive the said common power output shaft, and a second unidirectional clutch arranged operatively between said reaction member and said further gearing whereby the second turbine rotor will rotate faster than the ratio dictated by said further gearing when said unidirectional clutch free wheels, and a third unidirectional clutch arranged operatively between said second turbine rotor and said first turbine rotor to prevent the second turbine rotor from rotating faster than said first turbine rotor.

No references cited.

JULIUS E. WEST, *Primary Examiner.*